United States Patent [19]

Tsuno et al.

[11] Patent Number: 4,614,453

[45] Date of Patent: Sep. 30, 1986

[54] METAL-CERAMIC COMPOSITE BODY AND A METHOD OF MANUFACTURING THE SAME

[75] Inventors: Nobuo Tsuno, Kasugai; Yoshihiko Ishida, Nagoya, both of Japan

[73] Assignee: NGK Insulators, Ltd., Japan

[21] Appl. No.: 667,205

[22] Filed: Nov. 1, 1984

[30] Foreign Application Priority Data

Nov. 9, 1983 [JP] Japan .................................. 58-209226

[51] Int. Cl.⁴ ........................... F16B 9/00; F01D 5/28; F01L 1/14
[52] U.S. Cl. ........................................ 403/30; 403/273; 403/361; 403/404; 416/241 B; 416/244 A; 123/90.51
[58] Field of Search .............. 403/404, 273, 343, 361, 403/41, 30, 345, 165, 164, 179; 416/241 B, 244 A; 123/90.44, 90.51

[56] References Cited

U.S. PATENT DOCUMENTS

| | | | |
|---|---|---|---|
| 2,207,534 | 7/1940 | Corlett | 123/90.51 |
| 3,470,983 | 10/1969 | Briggs | 123/90.51 |
| 4,076,436 | 2/1978 | Slator et al. | 403/343 |
| 4,281,941 | 8/1981 | Rottenkolber | 403/404 |
| 4,325,647 | 4/1982 | Maier et al. | 403/179 |
| 4,424,003 | 1/1984 | Brobeck | 416/241 B |
| 4,484,833 | 11/1984 | Gallagher, Jr. | 403/343 |
| 4,508,067 | 4/1985 | Fuhrmann | 123/90.51 |

FOREIGN PATENT DOCUMENTS 1086821 2/1955 France .................. 403/361

Primary Examiner—Cornelius J. Husar
Assistant Examiner—Peter M. Cuomo
Attorney, Agent, or Firm—Parkhurst & Oliff

[57] ABSTRACT

Disclosed herein is a metal-ceramic composite body having a ceramic member with a small diameter portion and a large diameter portion which are formed by providing a ceramic member with a projection and a metallic member with a recessed portion or through hole. The ceramic member and the metallic member are bonded together by inserting the small diameter portion into the recessed portion or through hole such that a space being not less than the diameter of the small diameter portion is provided between the edge surface of the metallic member on the side of the ceramic member at the bonding portion and the back surface of the large diameter portion of the ceramic member. The thickness of the edge portion of the metallic member is gradually reduced toward the ceramic member at a radius of curvature of not smaller than 0.4 times as large as the diameter of the small diameter portion. A method of producing the metal-ceramic composite body is also disclosed herein.

11 Claims, 14 Drawing Figures

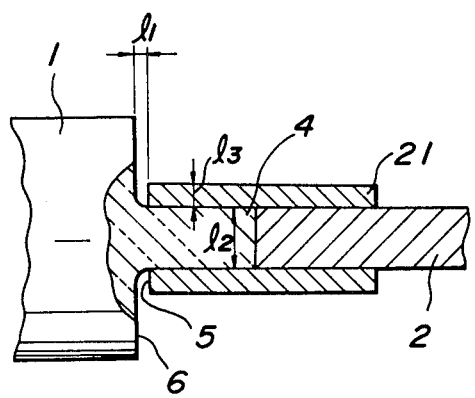
FIG_1
PRIOR ART
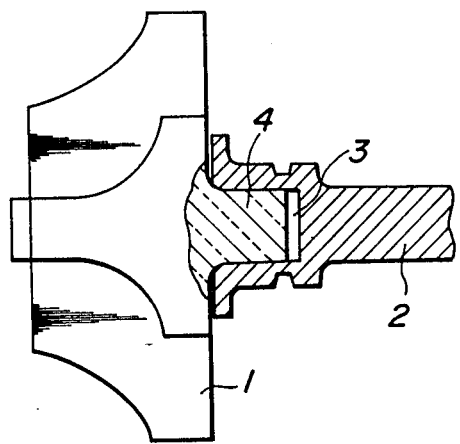
FIG_2
PRIOR ART

FIG_3
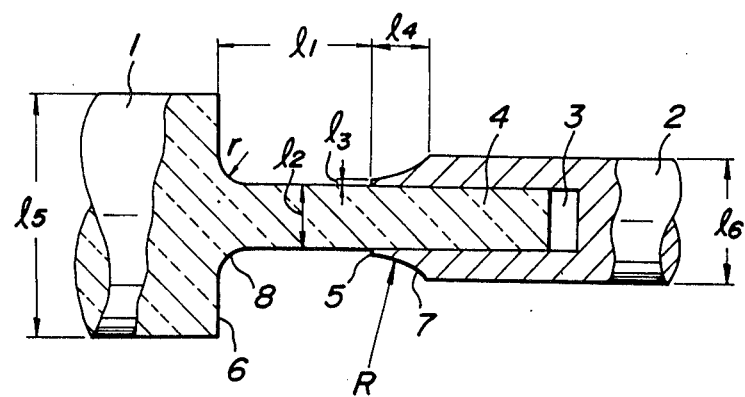
FIG_4
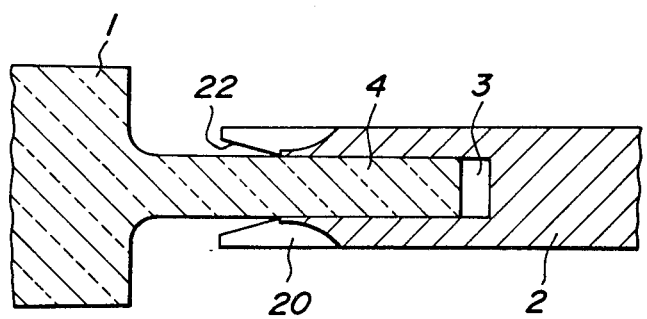

FIG_7
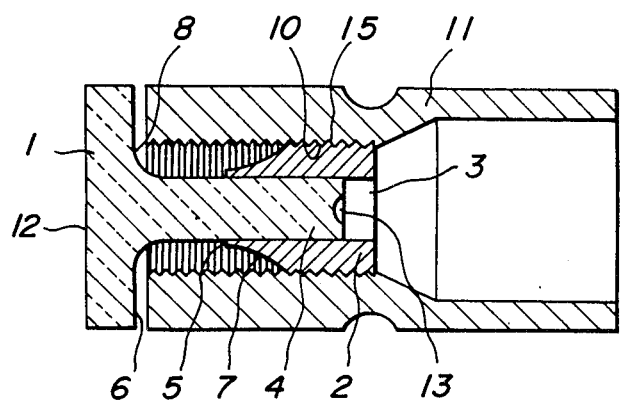
FIG_8
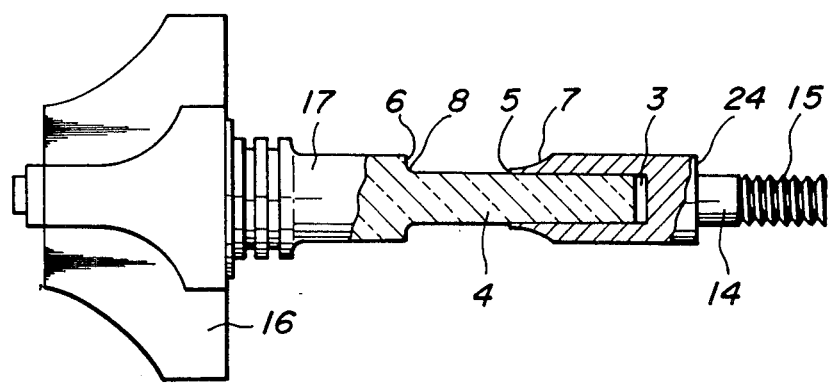

Distance $l_1$ between the Back Surface of the Large Diameter Portion of the Ceramic Member and the Edge Surface of the Recessed Portion of the Metal Member Thickness $l_3$ of the Tip of the Metal Member Radius r of Curvature of the Thickness-
Reducing Portion of the Ceramic Member

METAL-CERAMIC COMPOSITE BODY AND A METHOD OF MANUFACTURING THE SAME

BACKGROUND OF THE INVENTION (1) Field of the Invention

The present invention relates to a metal-ceramic composite body and a method of manufacturing the same.

(2) Description of the Prior Art

Since ceramics such as zirconia, silicon nitride, silicon carbide and the like are excellent in the mechanical strength, thermal resistance and wear resistance, these ceramics are now being noted as high temperature structural materials such as gas turbine engine parts, diesel engine parts and so on, and wear resistant materials. However, because ceramics are generally hard and brittle, they are inferior to metals in formability and workability. Further, it is difficult to form mechanical parts such as engine parts from the ceramic material alone due to its poor toughness. Therefore, the ceramic materials are generally used in a form of the composite structural body in which a metallic member and a ceramic member are bonded together.

Methods in which the metallic member and the ceramic member of the metal-ceramic composite body used as engine parts are mechanically bonded together, there are include, for instance, a structure in which a rotary shaft 1 of a ceramic turbine wheel and a rotary shaft 2 of a metal compressor wheel are bonded together by shrinkage fitting a metallic cylindrical collar 21 around the outer periphery thereof as shown in FIG. 1 (Japanese Patent Laid-Open No. 200,601/1982) and a structure in which a rotary shaft 4 of a turbine wheel made of ceramics is fitted into a recessed portion 3 formed at the end portion of a rotary shaft 2 of a metal compressor wheel (U.S. Pat. No. 3,666,302).

However, these conventional bonding structures have the following defects:

(1) Since the thickness of the metallic member at the bonding portion is large, a large stress concentration occurs at a portion of the ceramic member at which the ceramic member is inserted into the metallic member. That is, in the case of the metal-ceramic composite body having a conventional bonding structure, as shown in FIG. 1, since the outer diameter of the composite body changes at an edge 5 of the metal collar 21 to result in a discontinuous change in rigidity, when a tensile load or a bending load is applied to the composite body, the stress concentrates in the portion of the ceramic member near the edge of the metal collar, and fracture initiates from this portion.

(2) In the case of the conventional bonding structure as shown in FIG. 1, since a space $l_1$ between the back surface 6 of the large diameter portion of the ceramic member and the edge surface 5 of the metallic member is small, when a bending load is applied onto the bonding portion, the stress is concentrated upon the ceramic member at the space $l_1$, so that fracture occurs from this portion.

Similar defects are apparent in the embodiment shown in FIG. 2.

SUMMARY OF THE INVENTION

It is therefore an object of the present invention to provide a metal-ceramic composite body of a structure in which the stress concentration in the ceramic member due to the bending load is small to increase the strength of the whole composite body.

It is another object of the invention to provide a method of manufacturing such a metal-ceramic composite body.

According to the metal-ceramic composite body of the invention, a projection is provided on the ceramic member to form a large diameter portion and a small diameter portion for the ceramic member, the small diameter portion is fitted into a recessed portion or a through hole formed in the metallic member, wherein a space of not narrower than the diameter of the small diameter portion of the ceramic member is provided between the edge surface of the metallic member on the side of the ceramic member at the bonding portion and the back surface of the large diameter portion of the ceramic member, and the thickness of the edge portion of the metallic member is gradually reduced toward the ceramic member at a radius of curvature of not smaller than 0.4 times as large as the diameter of the small diameter portion of the ceramic member.

According to the metal-ceramic composite body-manufacturing method of the invention in which the metallic member and the ceramic member are monolithically bonded together by fitting the small diameter portion formed on the ceramic member into the recessed portion or the through hole formed in the metallic member, the above fitting is done in such a way that a space of not shorter than the diameter of the small diameter portion of the ceramic member is provided between the edge surface of the metallic member on the side of the ceramic member at the bonding portion and the back surface of the large diameter portion of the ceramic member, and the thickness of the ege portion of the metallic member is gradually reduced toward the ceramic member at a radius of curvature of not smaller than 0.4 times as large as the diameter of the small diameter portion of the ceramic member, and the length of the thickness-reducing portion and the thickness of the tip edge thereof are not less than 0.5 times and not greater than 0.2 times as large as the diameter of the small diameter portion of the ceramic body, respectively.

These and other objects, features, and advantages of the invention will be well appreciated upon reading the following description of the invention when taken in connection with the attached drawings with understanding that some modifications, variations and changes could be easily made by the skilled in the art to which the invention pertains, without departing from the spirit of the invention nor the scope of the claims appended hereto.

BRIEF DESCRIPTION OF THE DRAWINGS

The invention will be described more in detail with reference to the drawings, wherein:

FIGS. 1 and 2 are schematic views illustrating vertically sectional views of embodiments of conventional metal-ceramic composite bodies;

FIGS. 3, 5 and 6 are schematic views showing an embodiment of the metal-ceramic composite body according to the invention;

FIG. 4 is a schematic view illustrating an example of the method of manufacturing the metal-ceramic composite body according to the invention;

FIG. 7 is a schematic view showing a vertical sectional view of a tappet structure as a specific application example in which the metal-ceramic composite body according to the invention is used in combination with another metallic member;

FIG. 8 is a schematic view showing a vertical sectional view of a fitting portion of a turbocharger rotor as another specific application example of the metal-ceramic composite body according to the invention;

DETAILED DESCRIPTION OF THE INVENTION

Figure 5:
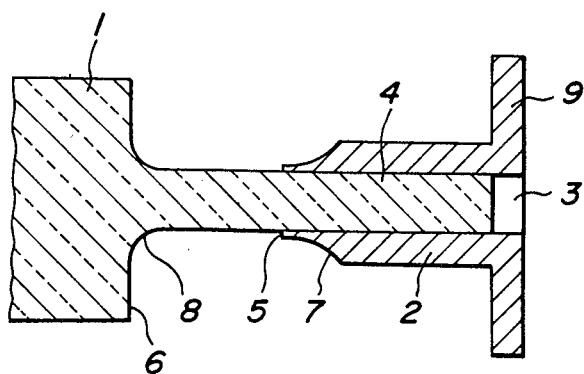

The present invention will be described more in detail with reference to the attached drawings.

FIGS. 3-6 show the structure of an embodiment of the metal-ceramic composite body according to the invention.

FIG. 3 is a vertical sectional view of the metal-ceramic composite body in which a small diameter portion 4 of a diameter of $l_2$ provided on a ceramic member 1 is fitted into a recessed portion 3 formed in a metallic member 2 in such a manner that a space $l_1$ may be present between the edge surface of the recessed portion 5 of the metallic member and the back surface 6 of the large diameter portion of the ceramic member. The thickness of the edge portion 7 of the metallic member on the side of the ceramic member is gradually reduced toward the tip edge at the radius "R" of curvature.

The space $l_1$ between the edge surface 5 of the recessed portion of the metallic member and the back surface 6 of the large diameter portion of the ceramic member is preferably not less than the diameter $l_2$ of the small diameter portion of the ceramic body. In order to prevent the stress concentration upon the ceramic member in the vicinity of the tip edge 5 of the thickness-reducing portion, the radius of curvature, "R", of the thickness-reducing portion 7 around the recessed portion of the metallic member, the thickness $l_3$ of the tip edge of the thickness-reducing portion and the length $l_4$ of the thickness-reducing portion are preferably set at not less than 0.4 times, not greater than 0.2 times and not less than 0.5 times the diameter $l_2$ of the small diameter portion of the ceramic member, respectively. The engagement between the recessed portion 3 of the metallic member and the small diameter portion 4 of the ceramic member may be peformed by either of shrinkage fitting and press fitting methods.

According to the metal-ceramic composite body of the invention, since the metallic member and the ceramic member are bonded together in such a manner that the space between the insertion edge surface 5 of the metallic member and the back surface 6 of the large diameter portion of the ceramic member is not less than the diameter $l_2$ of the small diameter portion $l_2$ of the ceramic member, the bending load imposed upon the composite body is supported by the ceramic member at the entire portion corresponding to the space $l_1$, so that no stress concentration occurs. If the space $l_1$ is less than the diameter $l_2$ of the small diameter portion of the ceramic member, the bending load is supported by a short portion of the ceramic member which results in high stress concentration, causing the small diameter portion 4 of the ceramic member to be fractured under application of a low bending load. Further, according to the metalceramic composite body of the invention, the thickness of the insertion edge portion 7 of the metallic member on the side of the ceramic member is gradually reduced toward the insertion edge surface 5 by the radius of curvature, R, which is not smaller than 0.4 times the diameter $l_2$ of the small diameter portion 4 of the ceramic member; is not greater than 0.2 times the diameter $l_2$; the thickness $l_3$ of the insertion edge surface 5 of the metallic member, and the length $l_2$ of the portion 7 at which the thickness of the edge portion of the metallic member is gradually reduced is not less than 0.5 times the diameter $l_2$. Thus the change in the outer diameter of the composite body at the edge 5 of the metallic member is mild. Therefore, stress concentration at this portion is minimized.

If the thickness of the insertion edge portion of the metallic member is not gradually reduced toward the side of the ceramic member, i.e. the outer diameter of the composite body at the insertion edge 5 of the metallic member abruptly changes then the stress concentrates upon in ceramic member, and the ceramic member can fracture even under a low load.

According to the metal-ceramic composite body, the thickness of the edge portion of the metallic member at a portion where the metallic member is engaged is gradually reduced toward the ceramic member so as to vary the rigidity of the bond discontinuously, thus mitigating the stress concentration problem.

When the diameter $l_2$ of the small diameter portion provided at the ceramic member is small and accordingly the thickness $l_3$ of the insertion edge surface of the metallic member is very small, it is difficult to process the tip edge such that the thickness $l_3$ of the insertion edge surface of the metallic member may not be larger than 0.2 times as large as the diameter $l_2$ of the small diameter portion of the ceramic member prior to the engagement between the metallic member and the ceramic member. Moreover the gradually reduced thickness portion 7 of the insertion edge portion of the metallic member is bent inside during processing, thereby disabling the succeeding engagement. Thus, it is necessary to process after the engagement.

FIG. 4 is a schematic view illustrating an example of the method of manufacturing the metal-ceramic composite body according to the invention. For example, the inlet portion of the recessed portion 3 in the main body portion of the metallic member 2 is preliminarily provided with a tapered portion 22 to facilitate the insertion of the small diameter portion 4 of the ceramic member into the recessed portion 3 of the metallic member by shrinkage fitting, press fitting, etc. After the small diameter portion 4 of the ceramic member 1 is fitted into the recessed portion 3 by press fitting, shrinkage fitting, etc., the edge portion 20 of the metallic member is cut off to obtain the metal-ceramic composite body with the thickness gradually reduced portion 7 as shown in FIG. 3. Moreover, depending upon necessity, the surface of the metallic member is hardened by surface quenching, nitrification treatment, hard plating or the like.

FIG. 5 is a vertically sectional view of a structural example of the metal-ceramic composite body according to the invention in which the small diameter portion 4 of the ceramic member 1 is fitted into the recessed portion 3 of a cylindrical metallic member having at one end of the cylindrical metallic member, a flange 9 larger in diameter than the diameter of the barrel. The metallic member of the metal-ceramic composite body according to the present invention can be jointed to another metallic member by way of this flange portion 9.

Figure 6:
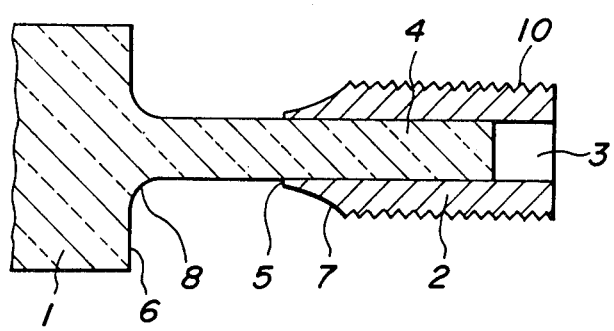

FIG. 6 is a vertically sectional view of a structural example of the metal-ceramic composite body in which the small diameter portion 4 of the ceramic member 1 is fitted into the recessed portion 3 of the cylindrical metallic member 2 on one side of the barrel portion of which a threaded portion 10 is formed. Another metallic member is assembled into the barrel portion of the metallic member of the metal-ceramic composite body of the invention by means of the threaded portion 10.

FIG. 7 shows a tappet having a cam-sliding surface 12 and a push rod-contact surface 13 made of ceramic and in which a through hole into which the metal-ceramic composite body according to the present invention can be inserted is bored in the cam-sliding surface of the tappet 11. The metal-ceramic composite body of the invention is fixed to the tappet by means of the threaded portion 15 formed in the through hole and the threaded portion 10 formed on the outer periphery of the metallic member of the metal-ceramic composite body of the invention.

FIG. 8 is a turbocharger rotor which is a specific example of the metal-ceramic composite body according to the present invention in which the small diameter portion 4 provided at the tip end of a rotary shaft 17, formed monolithically with a turbine wheel 16 made of ceramic material, is fitted into the recessed portion 3 formed at the tip end portion of a steel rotary shaft 14 on the side of a compressor wheel.

Next, the reasons for the limitation on the figures in the present invention will be explained on the basis of test results.

Figure 9:
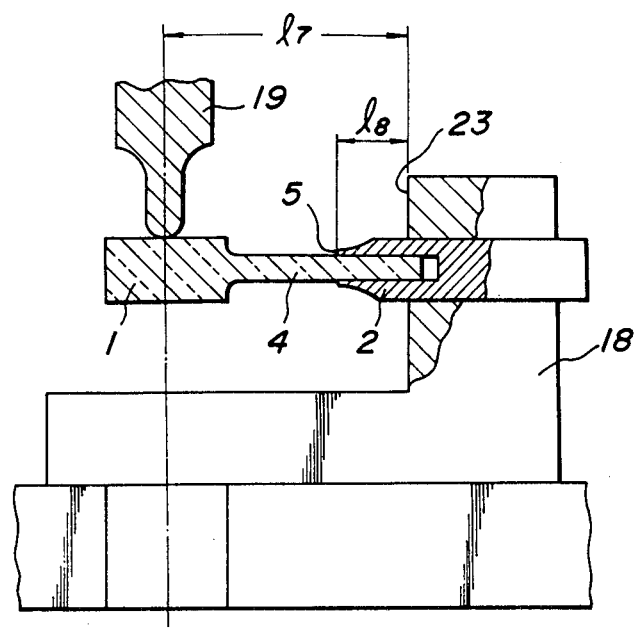
FIG. 9 is a schematic view illustrating a bending test method of the metal-ceramic body according to the invention.

A test piece of a metal-ceramic composite body having a profile shown in FIG. 3 in which a ceramic member of silicon nitride having the large diameter portion of a diameter $l_5=9$ mm, the small diameter portion of a diameter $l_2=5$ mm, the radius r of curvature of the thickness-reducing portion of the intermediate portion from the large diameter portion to the small diameter portion: $r=0 \sim 3$ mm, and the small diameter portion of a total length = 30 mm and a metallic member made of an annealed chromium-molybdenum steel (JIS-SCM 435) of the barrel diameter $l_6=9$ mm were bonded together. This test piece was subjected to the bending test by using a bending test device as shown in FIG. 9 in which a span $l_7=40$ mm and the distance $l_8$ between the fixed end 23 of the test piece and the edge 5 of the metallic member: $l_8=15$ mm. In the succeeding tests, results of which are shown in FIGS. 10–13, the ceramic member with the above dimensions was used, in which the radius r of the curvature at the thickness-reducing portion transferring from the large diameter portion of the small diameter portion of the ceramic member was fixed at 2 mm. In the test, as shown in FIG. 14, the ceramic member as defined in the above was used in which the radius r of curvature at the thickness-reducing portion in the ceramic member was varied in a range of $0 \sim 3$ mm.

Figure 10:
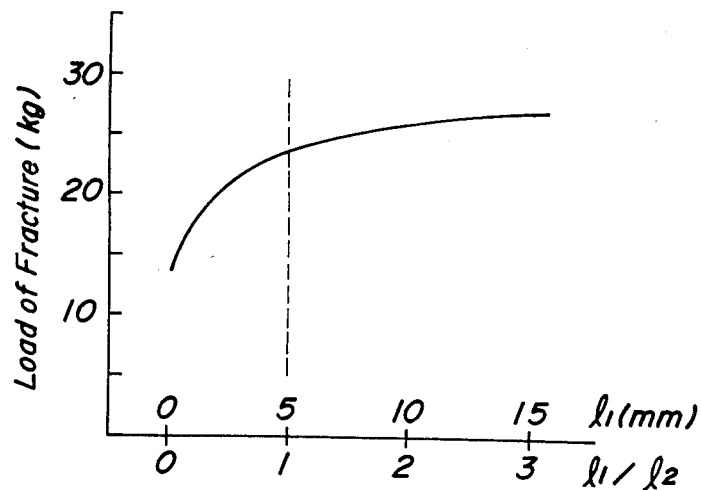
FIG. 10 is a characteristic diagram showing the relationship between the distance from the back surface of the large diameter portion of the ceramic member and the edge surface of a recessed portion of the metallic member and the bending strength of the metal-ceramic body.

FIG. 10 shows results of the bending test when the space $l_1$ between the back surface of the large diameter portion of the ceramic member and the edge surface of the recessed portion of the metallic member was varied, while the thickness $l_3$ of the tip edge of the metallic member, the length $l_4$ of the thickness-reducing portion of the metallic member, and the radius R of curvature of the thickness-reducing portion of the metallic member were held constant at values of 1 mm, 2.5 mm and 2 mm, respectively, with taking the bending load of the ceramic member on the ordinate axis coordinate, and the space $l_1$ on the abscissa. As obvious from FIG. 10, the bending load (load of fracture) required for breaking the ceramic member increases with the increase in the space $l_1$; and the load of fracture approaches a constant value when the space $l_1$ exceeds in size the diameter $l_2$ of the small diameter portion of the ceramic member. When the length $l_1$ is smaller than the $l_2$, the load necessary for causing the fracture of the ceramic member is rapidly lowered due to the stress concentration in the ceramic member. Therefore, it is preferable that the space $l_1$ between the back surface of the large diameter portion of the ceramic member and the edge surface of the recessed portion of the metallic member is not smaller than the diameter $l_2$ of the smaller diameter portion of the ceramic member.

Figure 11:
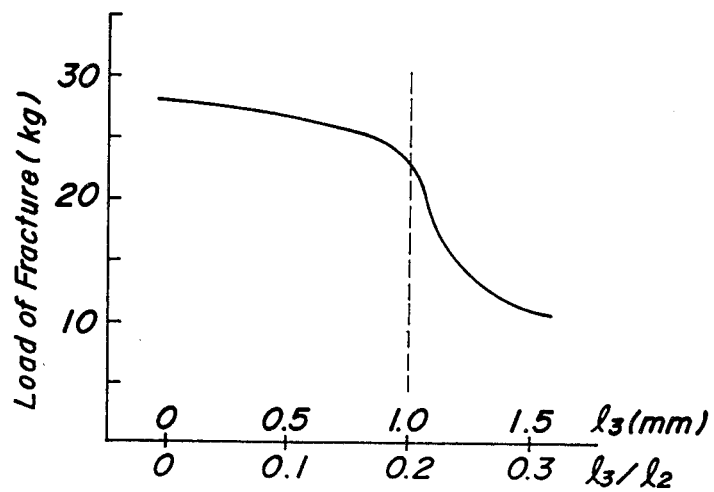
FIG. 11 is a characteristic diagram showing the relationship between the thickness of the tip edge of the metallic member and the bending strength of the metal-ceramic body.

FIG. 11 shows results of the bending test when the thickness $l_3$ of the tip edge of the metallic member was varied while the length $l_4$ of the thickness-reducing portion of the metallic member was 2.5 mm, the radius R of curvature of the thickness-reducing portion of the metallic member was 2 mm, and the space $l_1$ between the back surface of the large diameter portion of the ceramic member, and the load of fracture of the ceramic member was 5 mm, with the load of fracture of the ceramic member on the ordinate axes and the thickness $l_3$ of the tip edge of the metallic member on the abscissa. As shown in FIG. 11, the greater the thickness $l_3$ of the tip portion of the metallic member, the smaller the load of fracture of the ceramic member. When the thickness $l_3$ exceeds 0.2 times the diameter of the small diameter portion of the ceramic member, the load of fracture abruptly lowers. Therefore, the thickness $l_3$ of the tip edge of the metallic member is preferably not larger than 0.2 times the diameter of the small diameter portion of the ceramic member.

Figure 12:
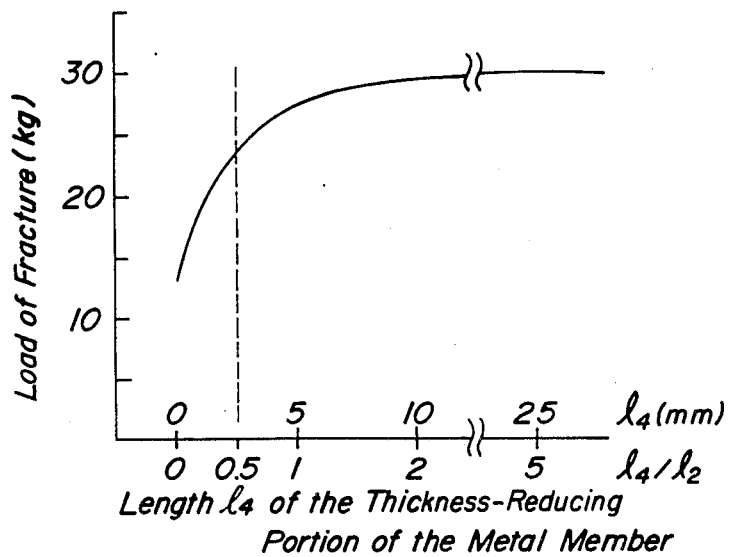
FIG. 12 is a characteristic diagram showing the relationship between the length of the thickness-reducing portion of the metallic member and the bending strength of the metal-ceramic body.

FIG. 12 shows results of the bending test when the length $l_4$ of the thickness-reducing portion of the metallic member was varied while the thickness $l_3$ of the metallic member was 1 mm, the radius R of curvature of the gradually reduced thickness portion of the metallic member was 2 mm, the space $l_1$ between the back surface of the large diameter portion of the ceramic member and the edge surface of the recessed portion of the metallic member was 5 mm. The load of fracture for the ceramic member is on the axis, whereas the length $l_4$ of the thickness-reducing portion of the ceramic member is on the abscissa. As obvious from FIG. 12, the larger the length $l_4$ of the thickness-reducing portion at the edge portion of the metallic member, the larger the load of fracture necessary for failure. When the length $l_4$ of the thickness-reducing portion exceeds 0.5 times the diameter of the small diameter portion of the ceramic member, the load of fracture approaches a constant value. However, when $l_4$ is not larger than 0.5 times $l_2$, the load of fracture rapidly drops. Therefore, the length $l_4$ of the thickness-reducing portion of the metallic member at the edge portion of the metallic member is preferably not smaller than 0.5 times as larger as the diameter of the small diameter portion of the ceramic member.

Figure 13:
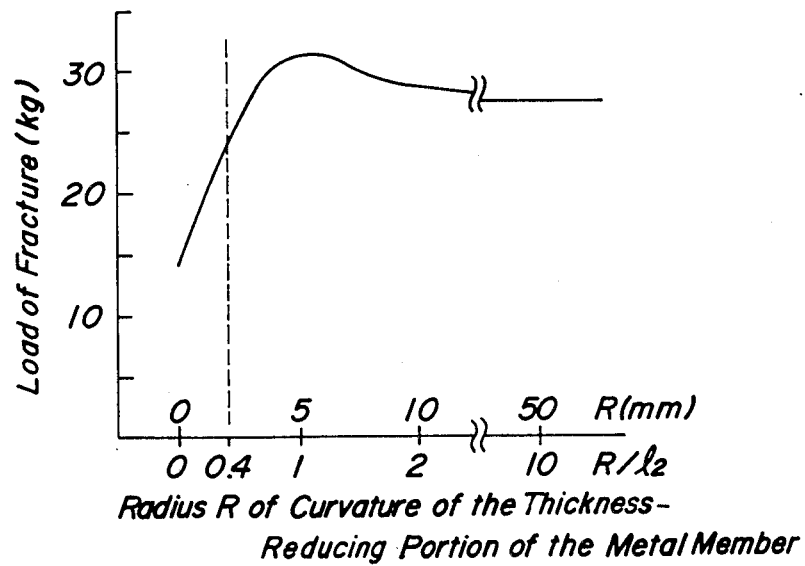
FIG. 13 is a characteristic diagram showing the relationship between the radius of curvature of the gradually reduced thickness portion of the metallic member and the bending strength of the metal-ceramic body.
Figure 14:
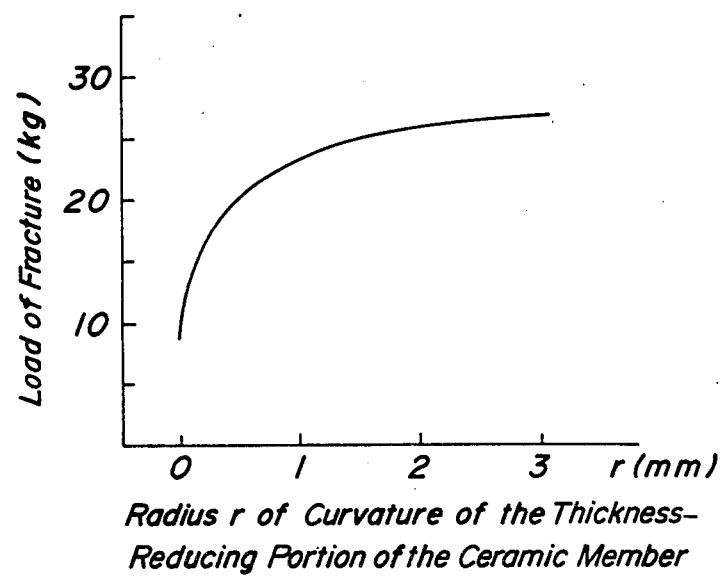
FIG. 14 is a characteristic diagram showing the relationship between the radius of curvature of the gradually reduced thickness portion of the ceramic member and the bending strength of the metal-ceramic body.

FIG. 13 shows results of the bending test when the radius R of the curvature of the thickness-reduced portion at the edge portion of the metallic member was varied while the space $l_1$ between the back surface of the large diameter portion of the ceramic member and the edge surface of the recessed portion of the metallic member was 5 mm, the thickness $l_3$ of the tip edge of the metallic member was 1 mm, and the length $l_4$ of the thickness-reducing portion of the metallic member was 2.5 mm. The load of fracture is on the ordinate axis and the radius R of curvature on the abscissa. As obvious from FIG. 13, when the radius R of curvature is not larger than 0.4 times the diameter $l_2$ of the smaller diameter portion of the ceramic member, the load of fracture rapidly drops, whereas when it is not lower than 0.4 times as large as the diameter of the small diameter portion, the load of fracture is substantially constant. Therefore, the radius R of curvature is preferably not smaller than 0.4 times as large as the diameter $l_2$ of the small diameter portion of the ceramic member.

FIG. 14 shows results of the bending test when the radius r of curvature of the thickness-reducing portion transferring from the large diameter portion to the small diameter portion of the ceramic member was varied while the space $l_1$ between the back surface of the large diameter portion of the ceramic member and the edge surface of the recessed portion of the metallic member was 5 mm, the thickness $l_3$ of the tip edge of the metallic member was 1 mm, the length $l_4$ of the thickness-reducing portion of the metallic member was 2.5 mm and the radius R of curvature of the thickness-reducing portion of the metallic member was 2 mm. The load of fracture is on the ordinate axis and the radius r of curvature of the thickness-reducing portion on the abscissa. As obvious from FIG. 14, when no thickness-reducing portion is present at a portion transferring from the large diameter portion to the small diameter portion of the ceramic member and the radius r of curvature is zero, the load of fracture is extremely low. Therefore, it is preferable that the thickness-reducing portion is provided at the portion transferring from the large diameter portion to the small diameter portion of the ceramic member.

The ceramic material constituting the metal-ceramic composite body according to the invention, can be selected from silicon nitride, silicon carbide, partially stabilized zirconia, alumina, beryllia and the like depending upon the use of the metal-ceramic composite body of the invention. For instance, when the turbocharger rotor is made of the metal-ceramic composite body, it is preferable that the turbine wheel, which is subjected to high temperatures, and the rotary shaft be made of silicon nitride having a high temperature strength. Meanwhile, a preferable material for a tappet having a cam-sliding surface of ceramic is partially stabilized zirconia having a high strength and a high toughness.

The profile of the thickness-reducing portion 7 of the edge portion of the recessed portion of the metallic member on the side of the ceramic member is not limited to a circular arc shape, and the profile of the thickness-reducing portion 7 may be, for instance, a quadratic curve, or the like, other than a circular arc, such as a parabola or an elliptical curve, so long as the radius of curvature at every point on the curve is not smaller than 0.4 times as large as the diameter of the small diameter portion of the ceramic member. Further, the profile of the thickness-reducing portion 7 may be in a linear form which corresponds to the case in which the radius of curvature is infinite.

Next, specific examples of the invention will be explained below, but they are merely illustrative of the invention and not restrictive.

EXAMPLE 1

A round ceramic bar of 9.0 mm in an outer diameter and 60.0 mm in length was prepared from silicon nitride and sintered under ordinary pressure. A projection of 5.0 mm in outer diameter and 40.0 mm in length was formed at one end of the ceramic bar to form a large diameter portion and a small diameter portion in such a manner that the diameter of the small diameter portion at the root thereof was gradually increased toward the large diameter portion at the radius of curvature of 1.0 mm. A recessed portion was formed at one end of a round bar made of aluminum chromium molybdenum steel (JIS-SACM 645) of 50.0 mm in total length and 9.0 mm in outer diameter. The recessed portion had a 4.98 mm inner diameter and a 45.0 mm depth. The thus obtained metallic member was shrinkage-fitted to the small diameter portion of the ceramic member at 500° C., and the following two kinds of metal-ceramic composite bodies as test pieces were prepared.

Test piece A was the metal-ceramic composite body having the features of the present invention, and was shrinkage-fitted such that the distance between the back surface of the large diameter portion of the ceramic member and the edge surface of the recessed portion of the metallic member was 15.0 mm. In addition, the edge portion of the metallic member was processed after the shrinkage-fitting in such a manner that the thickness of the edge portion of the metallic member was gradually reduced toward the ceramic member at the radius of curvature of 5.0 mm, and the length of the thickness-reducing portion and the thickness of the tip edge of the thickness-reducing portion were 4.0 mm and 0.05 mm respectively.

Test piece B was a metal-ceramic composite body which did not satisfy the features of the invention, and the shrinkage-fitting was done in such a manner that the distance between the back surface of the large diameter portion of the ceramic body and the edge surface of the metallic member on the side of the ceramic body was 0.05 mm, and no thickness-reducing portion was formed at the metallic member on the edge surface at the bonding portion.

The above test pieces A and B are subjected to the bending test by means of the bending test device shown in FIG. 9. The conditions in the bending test was that in FIG. 9, the span $l_7$ was 40.0 mm, the distance $l_8$ between the fixed edge 23 and the edge 5 of the metallic member was 15.0 mm, and the loading speed was 0.05 mm/sec.

According to results on the bending test, while the load of fracture of the test piece A was 32.0 kg, that of the test piece B was 12 kg. Therefore, the metal-ceramic composite body according to the invention is particularly superior to the conventional one in terms of the bending strength.

EXAMPLE 2

A turbine wheel of 61.0 mm in outer diameter and a turbine shaft of 9.0 mm in diameter, both made of silicon nitride, were sintered together under ordinary pressure to prepare a ceramic member of 72.0 mm in total length. A projection of 6 mm in diameter and 20.0 mm in length was formed at the tip end of the turbine shaft of the thus prepared ceramic member and a portion gradually reduced in diameter at a radius of çurvature of 1.0 mm was formed at the root portion thereof to form a small diameter portion and a large diameter portion. A recessed portion of 5.8 mm in inner diameter and 14.0 mm in depth was formed at one end of aluminum-molybdenum steel (JIS-SACM 645) of 60.0 mm in total length and 9.0 mm in diameter. The small diameter portion at the tip of the turbine shaft was forcedly inserted into the recessed portion at 350° C. such that the space between the edge surface of the recessed portion and the back surface of the large diameter portion was set at 10.0 mm. Thereafter, the edge portion of the metallic member was processed such that the thickness of the edge portion of the metallic member was gradually reduced toward the ceramic member at the radius of curvature of 6.0 mm, the length of the thickness-reducing portion was 4.0 mm, and the thickness of the tip was 0.05 mm. The rotary shaft of the turbocharger rotor on the side of the compressor wheel was processed to a profile of 5.0 mm in diameter as shown in FIG. 8. To this rotary shaft 14 on the side of the compressor was inserted a cylinder made of aluminum alloy (JIS-AC4C) having a 5.2 mm inner diameter, a 30.0 mm outer diameter a and a 25.0 mm length, which was fixed between a flange 24 and a threaded portion 15 provided at one end of the rotary shaft on the side of compressor wheel by a nut at a tightening torque of 15 kg.cm. This turbocharger rotor was placed into high temperature rotary test equipment, and was subjected to a rotary test at 150,000 rpm for one hour by using a combustion gas. Consequently, no abnormality was observed.

As obvious from the foregoing, according to the metal-ceramic composite body of the present invention, since the thickness of the edge portion of the metallic member on the side of the ceramic member at the bonding portion is gradually reduced, and a space not less than the diameter of the small diameter portion of the ceramic member is provided between the back surface of the large diameter portion of the ceramic member and the edge surface of the recessed portion of the metallic member, even when a bending load is placed upon the metal-ceramic composite body of the invention, no stress concentration occurs. Thus, the metal-ceramic composite body can tolerate a larger load than the conventional structural metal-ceramic composite body. Presuming that the bending load remains constant, the metal-ceramic composite body can be designed to be smaller in size than conventional metal ceramic bodies.

In particular, in the case of a turbocharger rotor in which the metal-ceramic composite body according to the present invention is formed by engaging the metal shaft into the ceramic turbine wheel and a ceramic shaft is subsequently connected thereto, since the turbine is light in weight and excellent in strength at a high temperature, a turbocharger rotor with high efficiency can be obtained.

Further, in the case of the tappet, the sliding surface contacting the cam can be made of ceramic by insertion of the metal-ceramic composite body according to the present invention. Accordingly, a tappet with an excellent wear resistance can be obtained.

As described in the above, the metal-ceramic composite body according to the present invention can be used for engine parts such as in turbocharger, piston, tappet, suction valve, exhaust valve, rocker arm, cam and the like. Moreover structural body parts which are repeatedly subjected to high temperatures and loading, forces can take advantage of the thermal resistance, heat insulating resistance, weight reduction, acid resistance and high temperature strength of the ceramic portion of the metal-ceramic body.

What is claimed is:

1. A metal-ceramic composite body comprising:
   a ceramic member having a large diameter portion with a front surface and a back surface and an integral small diameter portion extending from said back surface thereof; and
   a metallic member including a main body portion and an insertion edge portion, said main body portion having recess means said insertion edge portion including an insertion edge surface, said insertion edge portion having a thickness which gradually increases from said insertion edge surface toward said main body portion such that said increase in thickness has an outer radius of curvature of not less than 0.4 times as large as the small diameter portion of the ceramic member, said insertion edge portion forming an outer opening of said recess means such that said small diameter portion of the ceramic member is fitted into said recess means and a sapce of not less than the diameter of the small diameter portion of the ceramic member is provided between the insertion edge surface of the metallic member and the back surface of the large diameter portion of the ceramic member.

2. A metal-ceramic composite body according to claim 1, wherein said insertion edge surface of the metallic member has a thickness which is not greater than 0.2 times the diameter of the small diameter portion of the ceramic member.

3. A metal-ceramic composite body according to claim 1, wherein the length of said insertion edge portion of the metallic member is not less than 0.5 times the diameter of the small diameter portion of the ceramic member.

4. A metal-ceramic composite body according to claim 1, wherein the large diameter portion of the ceramic member is gradually reduced in sectional area at said back surface thereof toward the small diameter portion.

5. A metal-ceramic composite body according to claim 1, wherein the ceramic member comprises a part of a rotary shaft of a turbocharger rotor located on a turbine wheel side, and the metallic member comprises a part of a rotary shaft of the turbocharger rotor located on a compressor wheel side.

6. A metal-ceramic composite body according to claim 5, wherein the ceramic member comprises silicon nitride.

7. A metal-ceramic composite body according to claim 1, wherein the ceramic member comprises a part of a sliding portion of a tappet to a cam, and the metallic member comprises a part of a body of the tappet or a member used for bonding with the tappet body.

8. A metal-ceramic composite body comprising:
a ceramic member having a large diameter portion with a front surface and a back surface and an integral small diameter portion extending from said back surface thereof; and
a metallic member including a main body portion and an insertion edge portion, said main body portion having recess means, said insertion edge portion including an insertion edge surface having a thickness which is not greater than 0.2 times the diameter of the small diameter portion of the ceramic member, said insertion edge portion having a length which is not less than 0.5 times the diameter of the small diameter portion of the ceramic member and a thickness which gradually increases from said insertion edge surface toward said main body portion such that said increase in thickness has an outer radius of curvature of not less than 0.4 times as large as the small diameter portion of the ceramic member, said insertion edge portion forming an outer opening of said recess means such that said small diameter portion of the ceramic member is fitted into said recess means and a space of not less than the diameter of the small diameter portion of the ceramic member is provided between the insertion edge surface of the metallic member and the back surface of the large diameter portion of the ceramic member.

9. A method of manufacturing a metal-ceramic composite body comprising:
fitting a ceramic member having a large diameter portion with a front surface and a back surface and an integral small diameter portion extending from said back surface together with a metallic member including a main body portion and an insertion edge portion, said main body portion having recess means, said insertion edge portion including an insertion edge surface, said insertion edge portion being made by machining said metallic member to result in said insertion edge portion having a thickness which gradually increases from said insertion edge surface toward said main body portion such that said increase in thickness has an outer radius of curvature of not less than 0.4 times as large as the small diameter portion of the ceramic member, said insertion edge portion forming an outer opening of said recess means such that said small diameter portion is fitted into said recess feature and a space of not less than the diameter of the small diameter portion of the ceramic member is provided between the insertion edge surface of the metallic member and the back surface of the large diameter portion of the ceramic member.

10. A method of manufacturing a metal-ceramic composite body according to claim 9, wherein the metal-ceramic composite body is a turbocharger rotor, and the metallic member is a rotary shaft on a compressor wheel side of the rotor, and the ceramic member is a rotary shaft on a turbine wheel side of the rotor.

11. A metal-ceramic composite body according to claim 9, wherein the ceramic member comprises a part of a sliding portion of a tappet to a cam, and the metallic member comprises a part of a body of the tappet or a member used for bonding the tappet body.

* * * * *